Dec. 9, 1958  J. F. WOOD  2,864,013
SENSITIVE STRAIN RESPONSIVE TRANSDUCER
AND METHOD OF CONSTRUCTION
Filed June 29, 1953
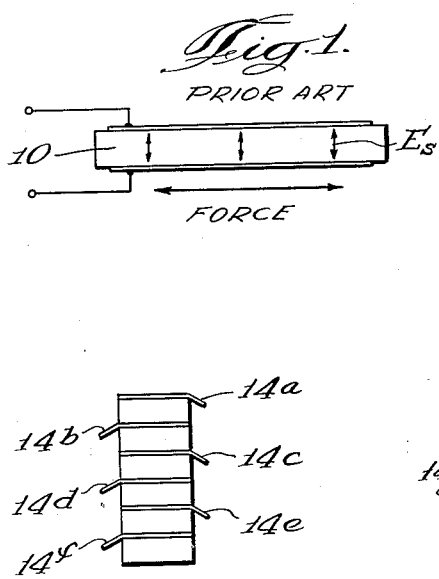
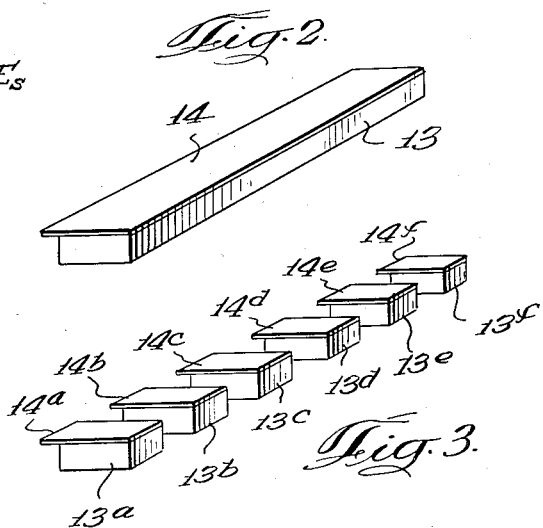
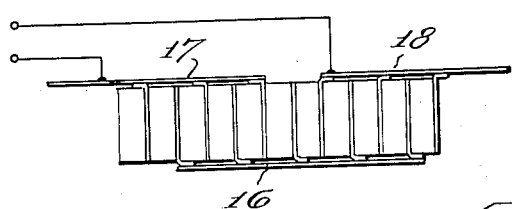
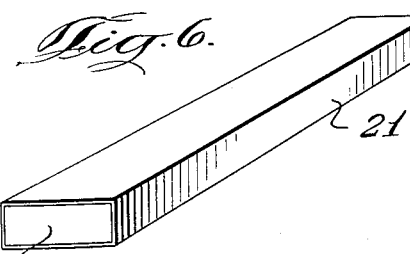
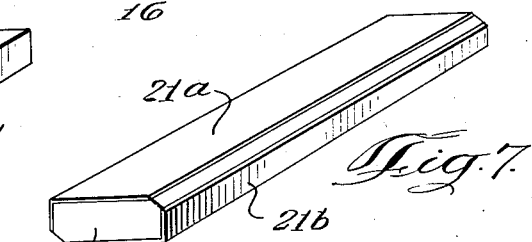
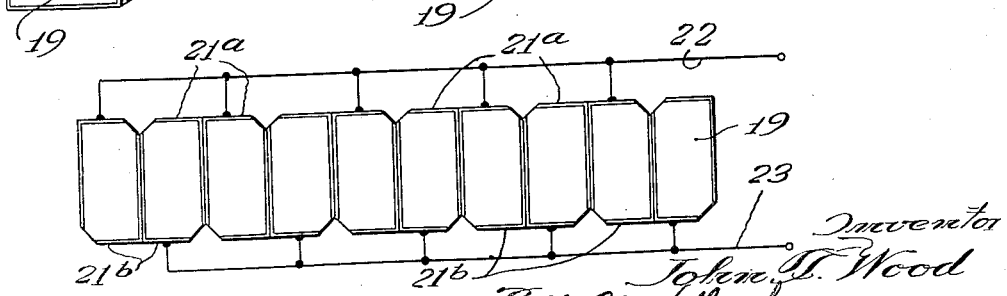
Inventor
John F. Wood
By Alois W. Graf Attorney United States Patent Office 2,864,013
Patented Dec. 9, 1958

2,864,013

SENSITIVE STRAIN RESPONSIVE TRANSDUCER AND METHOD OF CONSTRUCTION

John F. Wood, Buchanan, Mich., assignor to Electro-Voice, Incorporated, Buchanan, Mich.

Application June 29, 1953, Serial No. 364,679

2 Claims. (Cl. 310—8.3)

The present invention relates to a strain responsive transducer of increased sensitivity and to a method of constructing such transducer.

In the conventional transducers employing the piezoelectric effect, a single Bimorph element, or single slab element, is employed having on its opposite faces electrodes. An electrostatic field extends between these electrodes which is perpendicular to the direction of mechanical stress applied to the piezoelectric element. For manufacturing reasons, this has been necessary in order to provide adequate electrical capacitance in a conveniently small and not too expensive practical suit. Thus, for economic reasons, as well as for reasons of size, it has not been possible to utilize the maximum piezoelectric sensitivity.

It, therefore, becomes apparent that it would be desirable to provide an economically feasible method of constructing a piezoelectric or strain sensitive transducer having improved sensitivity characteristics as compared to piezoelectric units and devices now commercially used. In accordance with the present invention, it is proposed to arrange a plurality of capacitor plates perpendicular to the mechanical stress thereby to arrange the electrostatic field parallel to the direction of mechanical stress.

It, therefore, is an object of the present invention to provide an improved sensitive transducer wherein the electrostatic field is arranged parallel to the direction of mechanical stress.

It is a further object of the invention to provide a sensitive transducer having adequate capacitance.

A still further object of the invention is to provide a method of constructing a sensitive transducer.

A still further object is to provide a transducer having a plurality of capacitor plates arranged perpendicular to the applied mechanical stress and parallel to each other.

Other and further objects of the present invention subsequently will become apparent by reference to the following description taken in conjunction with the accompanying drawing, wherein:

Figure 1 illustrates the prior art for the purpose of explaining the improved construction of the present invention;

Figures 2, 3 and 4 illustrate successive steps in the construction of the improved sensitive transducer of the present invention;

Figure 5 is an alternative method of the assembly of the transducer for greater voltage sensitivity; and Figures 6, 7 and 8 show successive steps in an alternative mode of construction of a transducer of increased sensitivity.

Figure 1 shows the prior art construction wherein a slab or rectangular rod 10 of piezoelectric material was provided with electrodes 11 and 12. This piezoelectric material, which is strain responsive, may be of any suitable material, such as a Rochelle salt, or a ceramic material such as barium titanate. It will be noted from the force arrows $E_s$ that the electrostatic field is at right angles to the mechanical force arrows. Such construction has been necessitated because of economic factors and the requirement that sufficient electrical capacitance be provided in a practical unit.

In accordance with the present invention, it is proposed to take the rectangular slab or rod 13 of piezoelectric material, which may be a ceramic, and apply thereto an electrode 14, which may be of tin foil. Preferably the top and bottom surfaces of the ceramic slab or rod 13 are plated and tinned in the usual manner to provide a proper surface for electrical contact with the tin foil 14. The tin foil 14 is somewhat wider than the transverse dimension of the rod 13. Thereafter the rod 13 and the tin foil 14 are cut into smaller pieces such as 13a through 13e shown in Figure 3. The various pieces 13a through e, etc., are then arranged in a stack as shown in Figure 4 with alternate pieces, such as 13b and 13d rotated 180°. Thus, it will be seen in Figure 4 that the tin foil edges 14a, c and e are on one side, whereas the tin foil edges 14b, d and f are on the other side. A stack such as this of suitable length is then put into a suitable holder provided with some means for applying a resilient pressure to the longitudinal axis of the stack. The clamp and the stack of piezoelectric pieces are then placed into a furnace to bring the temperature up to the point where the tin foil elements are substantially at the melting point so as to securely bond together adjacent faces of the ceramic pieces. Thereafter the stack is removed and allowed to cool while under pressure. Suitable electrical connections are then made to the two sets of tin foil edges. In a stack such as shown in Figure 4, the various tin foil surfaces are therefore arranged perpendicular to the direction of mechanical stress, and hence the electrostatic stress is parallel to the mechanical stress. If it is desired to arrange the elements of the transducer so as to provide a higher voltage sensitivity, the elements could be arranged as illustrated in Figure 5 wherein alternate surfaces are connected to a conductive member 16. One-half of the remaining tin foil surfaces are connected to a conductive member 17, and the remainder connected to a conductive member 18. After suitable conductive elements are thus connected, the ceramic elements are charged in the conventional manner.

An alternative method of construction is illustrated in Figures 6, 7 and 8. In that arrangement the piezoelectric bar or ceramic rod 19 is plated on all four sides with a surface 21. After plating, two of the corners are ground off so as to leave two conductive elements 21a and 22b. Thereafter the rod 19 is cut into smaller pieces, or elements, in a manner similar to the cutting operation described in connection with previous Figure 3. The pieces thus formed are then stacked in a manner illustrated in Figure 8. Preferably contiguous surfaces are coated with a suitable solder paste containing finely divided low melting point solder. The entire stack is again placed into a suitable press or holder, and then placed into a furnace for heating. The heat then causes the solder paste to securely bond together adjacent plated surfaces. At the same time, it is possible to apply conductive strips on opposite sides of the stack so as to form the electrical connections diagrammatically illustrated by the conductors 22 and 23. After the assembled element has been heated, it is removed from the furnace and allowed to cool under pressure. When cooled, the element is removed and charged in the conventional manner.

While for the purpose of illustrating and describing the present invention certain preferred embodiments have been shown in the drawing, it is to be understood that the invention is not to be limited thereby since such variations are contemplated as may be commensurate with the spirit and scope of the invention as set forth in the accompanying claims.

I claim as my invention:

1. The method of constructing a sensitive transducer having metal surfaces perpendicular to the longitudinal dimension comprising plating the rectilinear sides of a rectangular rod of strain sensitive ceramic material, removing the plating along diagonally opposite corner edges, cutting said rod into short lengths, arranging said short lengths in a stack with plated surfaces adjacent each other and with said diagonally opposite corners of one length adjacent the diagonally opposite corners of the next length, thereby exposing the plating of the remaining sides of the said rectangle at opposite sides of said stack, applying a low temperature fusible metallic material to adjacent surfaces of said stack, applying pressure to said stack, applying heat to fuse said material to form an integral unit, and applying electrical connectors to the exposed platings.

2. A strain sensitive bender type transducer comprising a plurality of piezoelectric elements having six surfaces parallel to the axis thereof, the first and second surfaces and third and fourth surfaces being parallel to each other, respectively, and the first and third and second and fourth surfaces being joined by the fifth and sixth surfaces, respectively, a coating of electrically conducting material disposed on the first, second, third, and fourth surfaces, the fifth and sixth surfaces being uncoated, said elements being secured to each other in a stack with the coating of one element bonded to the coating of the adjacent element and the uncoated surfaces of said elements confronting each other.

References Cited in the file of this patent

UNITED STATES PATENTS

| | | |
|---|---|---|
| 2,479,926 | Gravley | Aug. 23, 1949 |
| 2,484,950 | Jaffe | Oct. 18, 1949 |
| 2,497,665 | Gravley | Feb. 14, 1950 |
| 2,540,194 | Ellett | Feb. 6, 1951 |
| 2,569,987 | Frondel | Oct. 2, 1951 |
| 2,636,134 | Arons | Apr. 21, 1953 |
| 2,636,135 | Peek | Apr. 21, 1953 |
| 2,640,165 | Howatt | May 26, 1953 |
| 2,648,785 | Tournier | Aug. 11, 1953 |
| 2,659,829 | Baerwald | Nov. 17, 1953 |

FOREIGN PATENTS

| | | |
|---|---|---|
| 728,121 | Germany | Nov. 21, 1942 |
| 125,463 | Sweden | July 12, 1949 |

UNITED STATES PATENT OFFICE
CERTIFICATE OF CORRECTION

Patent No. 2,864,013                                        December 9, 1958

John F. Wood

It is hereby certified that error appears in the printed specification of the above numbered patent requiring correction and that the said Letters Patent should read as corrected below.

Column 1, line 26, for "suit" read -- unit --.

Signed and sealed this 14th day of April 1959.

(SEAL)
Attest:

KARL H. AXLINE                                         ROBERT C. WATSON
Attesting Officer                                      Commissioner of Patents